(No Model.)

I. ROBBINS.
SLEIGH KNEE.

No. 567,047. Patented Sept. 1, 1896.

Witnesses
Christopher Nondelink
N. Louise Wright

Inventor
Isaac Robbins
By Edward Taggart
His — Attorney.

UNITED STATES PATENT OFFICE.

ISAAC ROBBINS, OF GRAND RAPIDS, MICHIGAN.

SLEIGH-KNEE.

SPECIFICATION forming part of Letters Patent No. 567,047, dated September 1, 1896.

Application filed June 18, 1895. Serial No. 552,721. (No model.)

*To all whom it may concern:*

Be it known that I, ISAAC ROBBINS, a citizen of the United States, residing at the city of Grand Rapids, in the county of Kent and State of Michigan, have invented certain new and useful Improvements in Sleigh-Knees, of which the following is a specification.

This invention relates to improvements in sleigh-knees; and the objects of the invention are, first, to produce a knee in which there will be a flexible connection between the runner and the beam, thereby preventing breakage and allowing the sleigh-beams to adjust themselves to a certain extent with reference to the runners; second, to so construct such adjustment that it may move freely without friction, and also to prevent any strain caused by the turning of the sleigh upon the attachments which connect the beam to the sleigh-runner. These objects I accomplish by means of the mechanism illustrated in the accompanying drawings, in which—

Figure 1:
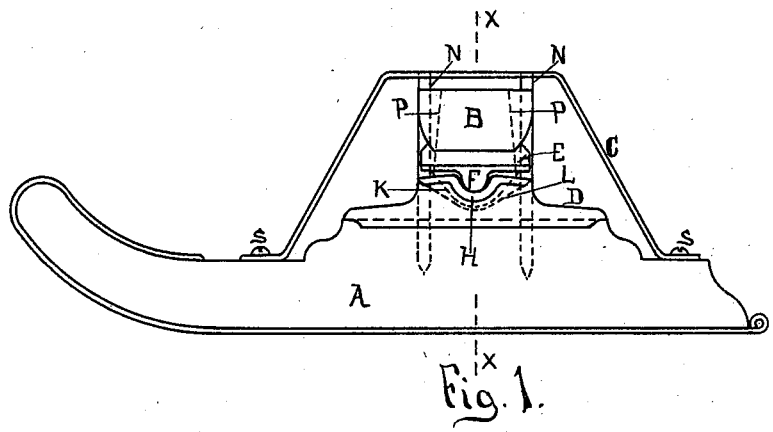
Figure 2:
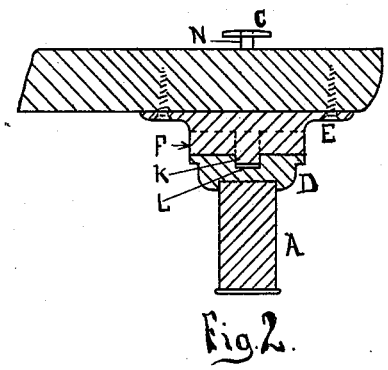
Figure 3:
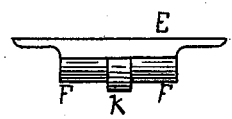

Figure 1 shows a side elevation of a sleigh-runner with the beam and knee connection made in accordance with my invention; and Fig. 2 shows a sectional view on line *x x* of Fig. 1, illustrating the position of the strengthening-flange. Fig. 3 shows a side elevation of what may be termed the "journal-bearings" and also the curved flange designed to take the lateral strain.

Similar letters refer to similar parts throughout the several views.

A represents a sleigh-runner.

B represents a beam constructed in the ordinary manner. E represents a plate securely attached to the said beam by bolts or other suitable means, and F represents the bearing connection between the beam or the plate E thereon and the knee or support D, the said part F having projections at either side which fit into curved bearing-places in the knee D. The part E and the bearings F F and also the central curved flange K are preferably made integral.

In the example of my invention shown in the drawings, D is a cast-metal support attached to the runner and provided with bearings H, in which the small rounded ends of F oscillate in order to make the flexible connection between the beam and the knee or support. A longitudinal flange, made preferably integral with F, is adapted to fit into a longitudinal groove L in the knee D. The longitudinal groove L is curved so as to correspond to the curved form of the flange K, which fits into the groove L. The flange K is not designed as a bearing on which the beam shall oscillate, but is designed to strengthen the connection between the beam on the plate E and the knee D, the said projection K extending nearly to the bottom of the groove, but not so as to have any frictional bearing; but in case the sleigh is turned to either side the sides of the flange K will then engage with the side of the groove L and form a practically rigid side-movement connection between the knee and the beam, the flange K extending to the front and to the rear of the bearings F for this purpose. Thus the strain will be entirely relieved from the bolts N N, which serve to attach the beam to the sleigh-runner, and also entirely removes the strain from the rod or bar C, which is used merely for retaining the beam and plate in operative connection with the knee D, C being a light rod or bar secured to the runner by the screws S S.

In Fig. 1 I have shown dotted lines to indicate the rocking movement of the beam B in relation to the support or knee D. These dotted lines are indicated by P P.

Having thus described my invention, what I claim to have invented, and desire to secure by Letters Patent, is—

In a sleigh-knee, the combination with a runner having a support secured thereto and provided with curved journals H and a curved groove L arranged between said journals and extending to the front and rear of said journals, of a beam, a plate secured on said beam and provided with curved bearing-surfaces F arranged to engage and be capable of having an oscillating movement in the journals H, and a longitudinal flange K arranged between said bearing-surfaces and extending to the front and rear thereof and seated in the longitudinal groove L, said flange being adapted to engage the sides of said groove when the sleigh is turned, substantially as described.

In witness whereof I have hereunto set my hand and seal in the presence of two witnesses.

ISAAC ROBBINS. [L. S.]

Witnesses:
EDWARD TAGGART,
CHRISTOPHER HONDELINK.